D. J. HOWENSTINE.
Horse Hay Fork.
No. 74,538.
Patented Feb. 18, 1868.
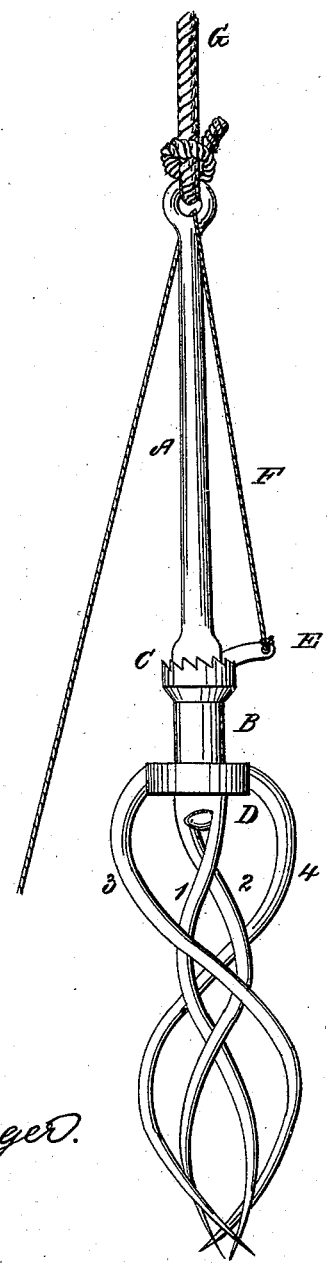
Witnesses:
John Cook.
Gabriel Henninger.
Inventor:
David J. Howenstine.

United States Patent Office.

DAVID J. HOWENSTINE, OF MARSHALLVILLE, OHIO, ASSIGNOR TO HIMSELF AND PATERSON V. WILKINS.

Letters Patent No. 74,538, dated February 18, 1868.

IMPROVEMENT IN HORSE HAY-FORKS.

*The Schedule referred to in these Letters Patent and making part of the same.*

TO ALL WHOM IT MAY CONCERN:

Be it known that I, DAVID J. HOWENSTINE, of Marshallville, in the county of Wayne, in the State of Ohio, have invented a new and improved Machine to Unload Hay with the Assistance of Horse-Power; and I do hereby declare that the following is a full and exact description thereof, reference being had to the accompanying drawings, and to the letters and figures of reference marked thereon.

The nature of my invention consists of an upright rod, A, the lower part of which extends through a tube, B, resting on a shoulder, C, preventing it from passing any further through; then a nut or boss, D, fastened to the lower end of rod A, to prevent it from lifting out of tube B; also allowing rod A to revolve in tube B. To the nut D are attached the prongs 1 and 2, which are coiled in the same direction, in the manner of a corkscrew, being stationary on the rod A. The tube B has also two prongs, 3 and 4, which coil in an opposite direction from the prongs 1 and 2, so that when pressed in the hay, the two inside prongs 1 and 2 revolve in an opposite direction from the outside prongs 3 and 4, and by the latch E, which extends through rod A in a mortise, and latches in the niches on the top of tube B, which have square shoulders on one side, and slope out on the other, to allow the latch to slide over the niches when the prongs are entering the hay, and to retain them in that position when entered, until the hay is carried to the desired point, when, by raising the latch by a cord, F, the weight of the hay rolls the prongs back and falls off. The spring on the top of the latch is to press it into the niches, and the ring or hole in the top of rod A is to fasten the rope G which raises the fork, and also to draw the cord F through which raises the latch.

What I claim as my invention, and desire to secure by Letters Patent, is—

The spiral tines 1 and 2, attached to revolving shaft A, in combination with the spiral tines 3 and 4, attached to the sleeve B, in combination with latch E and rope F, when arranged and operating substantially as herein described.

DAVID J. HOWENSTINE.

Witnesses:
JOHN COOK,
GABRIEL HERMINGER.